April 17, 1962
P. E. QUENEAU ET AL
3,030,201
METHOD OF PRODUCING FERRO-NICKEL FROM
NICKEL-CONTAINING SILICATE ORES
Filed Sept. 2, 1960
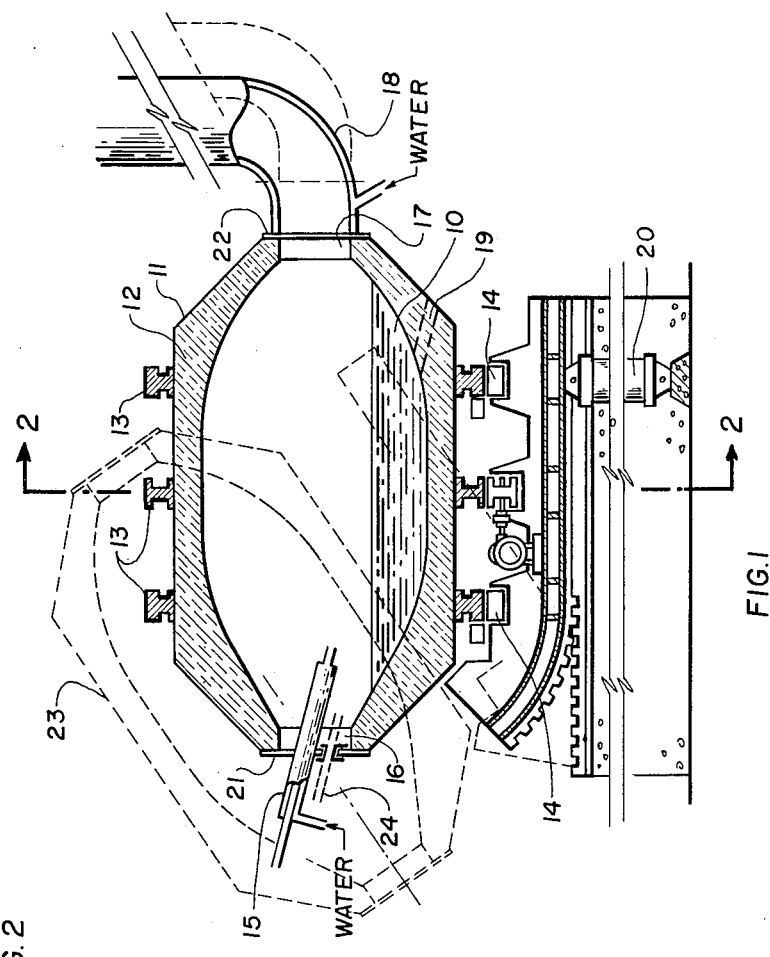
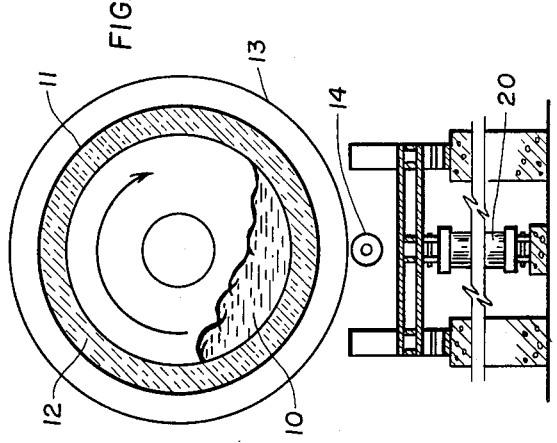
BO MICHAEL S. KALLING
PAUL E. QUENEAU
INVENTOR.
BY
ATTORNEY

3,030,201
METHOD OF PRODUCING FERRO-NICKEL FROM NICKEL-CONTAINING SILICATE ORES

Paul Etienne Queneau, Fairfield, Conn., and Bo Michael Sture Kalling, Stockholm, Sweden, assignors to The International Nickel Company, Inc., New York, N.Y., a corporation of Delaware
Filed Sept. 2, 1960, Ser. No. 53,793
7 Claims. (Cl. 75—21)

The present invention relates in general to an improved process for the treatment of lateritic nickel-containing ores and more particularly to a novel process for the recovery of nickel from such ores in the form of a high-grade ferro-nickel.

The improved process is particularly adaptable to treating lateritic nickel ores of the silicate type found in many areas in the world such as those found in New Caledonia, the United States and Venezuela. The raw ore before processing contains considerable free water and combined water. On a dry basis such ores normally analyze substantially less than 5% nickel, less than 0.10% cobalt and not more than 25% iron by weight. The hereindescribed novel process is adaptable, however, for any nickel-containing oxidic ores unsuitable for iron ore production, for example, less than one third by weight of iron. In referring to nickel hereinafter it is meant to include any cobalt present in the ore being treated.

Heretofore, in commercial practice nickel-containing silicate ores have been treated pyrometallurgically by the Krupp-Renn and various electric smelting processes for the recovery of nickel in the form of a nickel-iron alloy or as impure metallic nickel by a relatively complex procedure including blast furnace, converter, roasting and reduction operations. The nickel-iron so produced is a relatively low-grade material, sometimes containing less than 10% nickel and always containing more iron than nickel. Nickel-iron "luppen" obtained by the Krupp-Renn process contain less than 25% nickel, more than 0.25% sulfur, more than 0.25% carbon and the balance substantially all iron.

In one of the electric smelting processes, the ore is preheated and then melted in an electric furnace and the resulting molten material mixed with a bath of ferronickel and a reducing agent such as ferro-silicon. After dephosphorizing in a separate furnace, a marketable nickel-iron containing less than 50% nickel and relatively high in silicon is obtained. In another commercial process, the ore is preheated and electric smelted using coke for reduction. The resulting crude nickel-iron product is desulfurized and then treated by conventional means in a Bessemer converter to eliminate impurities such as chromium, silicon, phosphorus and carbon. The nickel-iron so produced has a nickel content of only about 25%.

Although attempts have been made to obtain a ferronickel containing at least about twice as much nickel as iron from this type of ore, none, as far as we are aware, has been successfully carried into practice commercially on an industrial scale.

It has now been discovered that lateritic nickel-containing ores may be processed economically to a ferronickel with a nickel content of at least about 65% by a gaseous selective reduction treatment followed by upgrading by an improved furnace treatment.

It is an object of the present invention to provide a method for recovering nickel from oxide ores as a high-grade ferro-nickel by special smelting techniques.

Another object of the invention is to provide a novel process for the treatment of silicate ores for the recovery of nickel and a controlled amount of iron contained therein in the form of high-grade ferro-nickel containing at least about twice as much nickel as iron.

It is a further object of the invention to provide a method for directly smelting nickel-containing silicate ores to reduce and smelt most of the nickel and a controlled proportion of iron followed by upgrading to a ferro-nickel alloy containing at least about 65% nickel.

The invention further contemplates providing a special means for obtaining a high-grade ferro-nickel from a low-grade ferro-nickel by top-blowing with oxygen.

Other objects and advantages will become apparent from the following description taken in conjunction with the accompanying drawing in which:

FIGURE 1 shows a longitudinal section through a rotary kiln-type furnace in which a high-grade ferro-nickel may be obtained according to the hereindescribed process; and FIGURE 2 depicts a cross-section of the same furnace.

Generally speaking, the present invention contemplates subjecting comminuted or finely-divided nickel-containing silicate ores to a selective reduction treatment under controlled conditions of atmosphere and temperature to reduce substantially all the nickel and advantageously not more than about twice as much iron to the metallic state. The nickel-iron alloy formed in the reduction treatment is separated from the balance of the ore after a melting operation. This alloy may then be top-blown with commercial oxygen in a special furnace, advantageously acid-lined, to eliminate a judicious amount of iron and upgrade the product to at least 65% nickel and to remove such impurities as chromium, silicon, carbon and phosphorus and to form a nickel-rich, refined ferro-nickel.

Ores containing significantly greater proportions of iron and cobalt than indicated hereinbefore would advantageously not be treated by the hereindescribed process because of the resulting heavy losses of iron and cobalt. For the treatment of lateritic ores containing these greater proportions of iron and cobalt, the processes described by one of the present inventors in U.S. Patent No. 2,850,376 and in U.S. patent application Serial No. 757,110, filed on August 25, 1958, now U.S. Patent No. 2,998,311 are preferred. In these processes substantially all the nickel, cobalt and iron content of the ore can be recovered economically as high quality products.

The finely-divided ore which is dried and comminuted, if necessary, is treated, advantageously in a rotary kiln, at an elevated temperature in a controlled reducing atmosphere, formed by the partial combustion of such fuels as oil, natural gas or coal. The hot reducing gases are passed over the charge and the atmosphere is controlled so that substantially all the nickel in the ore is reduced to metal while at the same time advantageously not more than about twice as much iron as nickel is reduced to metal. Normally we do not reduce more than about twice as much iron as nickel in that fuel consumption and treatment time increases as more iron is reduced and this iron, and any subsequently required flux, is wasted as slag in the upgrading operation. Furthermore, the melting point of the high magnesia electric furnace slag is lower if a substantial ferrous oxide content is maintained. However, we desire to reduce as much iron as will allow substantially all the nickel to be reduced and recovered.

The reducing operation is preferably conducted in a manner broadly similar to that described by one of the present inventors in U.S. Patent No. 2,850,376. In the process described in this patent, nickel-containing lateritic ores are treated in controlled reducing atmospheres at above about 935° F. so that in subsequent treatment with carbon monoxide substantially all the nickel and not more than about twice as much iron is volatilized as carbonyls. The reduction operation employs gas ratios based on the proportions of carbon monoxide and carbon dioxide in the atmosphere practically in equilibrium with the hot solid charge in the furnace at the final reaction temperature as described in U.S. Patent No. 2,850,376. The CO to $CO_2$ or $H_2$ to $H_2O$ ratios of the reducing atmospheres used in the process will, however, allow the reduction of more than twice as much iron as nickel to metal. The temperature of the reducing operation should advantageously be at least 1600° F. and most advantageously should be just below the point of incipient fusion of the ore being treated i.e. no substantial ore agglomeration occurs.

Although the reducing operation, is advantageously carried out in a rotating kiln, the operation may also be accomplished in other types of apparatus such as multi-hearth and fluid bed furnaces.

The preferentially reduced ore is smelted, advantageously in an electric furnace, to form a mixture of molten nickel and iron which collects at the bottom of the furnace below the fluid slag. Because the required selective reduction of the ore has been fully accomplished outside the electric furnace there is an important saving in electrical energy i.e. the standard practice of endothermic reduction in the smelting furnace is eliminated. Thus, the only major heat requirements in the electric furnace are those for melting the ore which has advantageously been preheated during reduction to just below its incipient fusion point and by using relatively cheap coal, oil or gas in the selective reduction operation considerable economies are realized over having to use frequently expensive, or hard to obtain, electrical energy. Another important advantage of our technique of prior selective reduction of the ore outside the electric smelting furnace is that the ore is in a uniform condition on being charged to the electric furnace with resulting advantages understood by those skilled in the art. Our controlled, gaseous pre-reduction technique also eliminates addition of carbon to the electric furnace which can be costly and cause difficulties due to blowing and boiling from generation of large volumes of gas or from excessive iron reduction.

An "electrodes-in-line" rectangular, electric melting furnace instead of an "electrodes-in-triangle" circular electric furnace can be employed in that the heat requirements for melting the treated ore are relatively low. By using a rectangular furnace, ore transfer from kiln to furnace is simplified by reason of easier feeding such as by fettling along the side walls of the furnace to permit rapid and direct movement of hot, selectively reduced ore from kiln to furnace with minimum loss of temperature and minimum dusting and to protect refractories. Inert gas such as waste nitrogen from oxygen generation may be employed to prevent reoxidation of the ore during transfer.

The slag formed in the smelting operation contains the unreduced iron, the magnesia, the silica, the alumina and other gangue constituents of the ore. Iron slag from the subsequent iron elimination operation may reverted to the electric furnace for recovery of any nickel contained therein. This iron slag has the effect of reducing the melting point of the electric furnace slag.

The nickel-iron melt formed in the electric furnace is tapped and treated for removal of iron and other impurities. Iron removal is carried out by top blowing with oxygen in the rotating furnace as depicted in the accompanying drawing in which a longitudinal section of the furnace is shown in FIG. 1 and a cross-section of the furnace through location 2—2 of FIG. 1 is depicted in FIG. 2. Referring to the drawing, the molten nickel-iron material 10 is treated in a rotary kiln-type furnace 11 which is lined with refractory brick 12. The furnace may be tilted as desired for tapping by using tilting mechanism 20. The furnace has tires or drive rims 13 affixed circumferentially around it and these tires rest on supporting or drive wheels 14. Oxygen is supplied by a water-cooled tube or pipe 15 which projects through seal 21 and opening 16 into the furnace. Exhaust gases pass out of opening 17 at the other end of the furnace into the flue 18 which may be water-cooled and which may be swung away from the furnace opening to allow charging of fresh flux, revert scrap or other materials through opening 17. Alternatively, fluxes or other materials may be charged through port 24. Seal 22 provides a gas-tight contact between the furnace and flue 18. Slag may be withdrawn by tilting the furnace and tapping from the top of the molten bath. At the completion of the blow, molten ferro-nickel is tapped by tilting the furnace into the position shown by 23 in FIG. 1 or is optionally withdrawn through taphole 19.

We employ mechanical means, which is independent of gases introduced into the furnace, for bath agitation to obtain efficient and effective gas-liquid-solid contact throughout the bath by induced turbulence. The Kaldo top blown oxygen furnace as described by one of the present inventors in U.S. Patents Nos. 2,598,393 and 2,853,377, may also be utilized. This furnace provides the intimate gas-solid-liquid contact which is conducive to efficient elimination of iron and impurities. It also provides the mechanical stirring which is important in achieving equilibrium conditions between the several reactants, e.g. slag and metal, which is of great importance for high nickel recovery, i.e., at least 90% of the nickel in the ore.

The molten nickel-iron material is treated in the rotary furnace by bringing into direct contact with its surface commercial oxygen supplied through a pipe extending into the furnace above the molten charge. The essential turbulence in the molten bath is primarily achieved by rotation of the furnace at controlled speeds as used in the aforementioned Kaldo process, although some further turbulence also results from the oxygen blow.

The nickel-iron melt is blown in the rotating furnace to oxidize and slag off iron with a convenient fluxing material such as silica. The slagging concept in our process is different to that in the steel industry which desires minimum elimination of iron while we desire the opposite, i.e., maximum elimination of iron consistent with satisfactory nickel recovery. The whole iron elimination operation can be conducted autogenously due to heat generated by oxidation of the iron and other impurities. Iron is readily eliminated and slagged off by this technique until the metal has a nickel content of at least about 65%. Tapping of the slag may occur continuously or semi-continuously by stopping the rotating furnace at frequent intervals or slag tapping may be carried out only once or twice durnig the blowing of one furnace batch.

The temperature of the iron elimination operation in the rotating kiln can be controlled in general by varying the oxygen flow rate, by observing exhaust gas temperature and by varying cascading intensity. For reasons of heat economy, the oxygen content of the blast should be as high as practicable while at the same time keeping the temperature of the operation below 3100° F. Suitable cooling materials such as silica flux or nickel-containing scrap may be added.

As described hereinbefore, the iron slag formed in the rotating, iron elimination furnace is reverted to the electric smelting furnace for recovery of its nickel content and to reduce the melting point of the electric furnace slag. Advantageously, the slag produced during the first part of the blow is reverted to the smelting furnace and the slag produced during the last part of the blow is retained in the top blown furnace for reduction of its nickel content during the first part of the next blowing cycle. The high grade ferro-nickel with a nickel content of at least about 65% is periodically tapped from the refining furnace.

The refining operation in the top blown furnace is, of course, instrumental in eliminating substantially all other impurities from the molten metal such as chromium, silicon, carbon and phosphorus which are oxidized and blown or slagged off during the initial part of the blow.

Phosphorus removal presents no difficulties in our novel process for producing ferro-nickel since any silicon in the crude metal is oxidized and slagged off early in the blow. The absence of silicon in the molten metal allows for the easy elimination of phosphorus. Removal of sulfur by conventional means either before or after the removal of other impurities presents no difficulties.

The hereindescribed novel technique of combining special gaseous selective reduction of silicate-type nickel ores with a novel procedure of economically top blowing with oxygen a mechanically agitated nickel-iron melt provides a process for economically obtaining a high-grade ferro-nickel analyzing at least about 65% nickel and containing at least about 90% of the nickel in the ore.

The operations described herein for obtaining high-grade ferro-nickel can, if desired, be accomplished directly in our furnace (see FIG. 1) which provides the necessary efficient and effective gas-solid-liquid contact throughout the bath. The mechanical stirring provided by the furnace is important in achieving equilibrium conditions between the several reactants and thereby obtaining a satisfactory nickel upgrading and yield. The greatly improved heat transfer obtained in this furnace as compared to ordinary open hearth or reverberatory furnace practice is due to the fact that the gas heated portion of the refractory lining is in continuous heat exchange with the charge due to furnace rotation and that the charge itself is in a state of turbulence due to mechanical agitation. Thus, the ore can be melted directly in the furnace and preferentially reduced under selective reducing conditions so that substantially all the nickel in the ore is converted to metal. After slag removal, the metal product is top blown with oxygen for removal of most of the reduced iron to yield a ferro-nickel of at least 65% nickel content. In the course of this operation, impurities such as chromium, silicon, carbon and phosphorus are also removed.

For the purpose of giving those skilled in the art a better understanding of the invention and/or a better appreciation of the advantages of the invention, the following illustrative example is given:

Venezuelan ore containing 1.80% nickel, 0.03% cobalt, 15% iron, and 34% silica was ground and selectively reduced in a rotary kiln at 1600° F. in an atmosphere containing CO, $CO_2$, $H_2$ and $H_2O$ and having a $CO:CO_2$ ratio of 1.6:1. The hot, selectively reduced ore was smelted in an electric furnace to produce a nickel-iron containing 34% nickel and the balance mainly iron. Nickel recovered was 95% of the total nickel in the ore. This crude nickel-iron was then top-blown with oxygen in the presence of siliceous flux to remove the major part of the iron as slag. This resulted in the production of a high-grade ferro-nickel which analyzed 68.8% nickel and the balance substantially all iron, and of a slag containing 0.5% nickel for retreatment in the aforementioned electric furnace smelting operation. An overall nickel recovery of 93% was obtained In another test carried out in a rotating furnace 2980 kgs. of ferro-nickel was treated through oxidation with oxygen that was blown into the furnace through a pipe directed against the bath from above. The furnace which was kept in rapid rotation, had an inside diameter of 5 feet and an inside length of also 5 feet. At the start of the test the metal had a nickel content of 35.5% Ni and the rest was almost entirely iron.

The furnace was lined with silica brick. To reduce the attack on the lining, additions of silica sand were made during the blow with intention to obtain a $SiO_2$ content in the slag not very much below the saturation limit of 55–60% characteristic for this type of silica slags at the temperature range in question.

Simultaneously with oxygen a quantity of butane was blown into the furnace through a special pipe to keep the temperature at the desired level in spite of the relatively large addition of silica sand.

The speed of rotation was during the main part of the heat about 40 r.p.m. which showed a favourable effect on the course of the reaction.

As the slag quantity during the blow was larger on account of the oxidized iron and the added silica sand, the main part of the slag formed was tapped off twice during the blow. At the end of the blow, the remaining slag was tapped off from the furnace at the same time as the refined metal.

The following table is a survey of the results obtained from the heat.

| Blowing period | I | II | III | Total |
| --- | --- | --- | --- | --- |
| Added: | | | | |
| Silica sand, kg | 750 | 900 | 300 | 1,950 |
| Oxygen, m.³ | 175 | 207 | 89 | 471 |
| Butane, m.³ | 13 | 17 | 8 | 38 |
| Slag, kg | 1,428 | 1,203 | 988 | 3,619 |
| Tapped off: | | | | |
| FeO, percent | 48.0 | 43.0 | 41.0 | |
| SiO₂, percent | 52.0 | 56.0 | 56.0 | |
| Ni, percent | 0.1 | 0.29 | 0.44 | |
| Metal, kg | | | 1,318 | ¹ 1,318 |
| Ni, percent | 47.5 | 62.7 | 71.5 | |
| Blowing time, min | 45 | 58 | 28 | 131 |

¹ Some metal was left in the furnace.

The temperature was kept at 2825°–2910° F. during the blow.

The loss of nickel in the slag has, following the results above, been calculated to be 0.93% altogether of the total nickel content. Gasifying of metal was fully prevented by this way of performing the process and especially by the combination of rapid rotation and a thick slag layer in the furnace.

The wear of the lining during the blow was low.

This application is a continuation-in-part of our co-pending U.S. application Serial No. 839,513, filed September 11, 1959.

Although the present invention has been described in conjunction with preferred embodiments, it is to be understood that modifications and variations may be resorted to without departing from the spirit and scope of the invention, as those skilled in the art will readily understand. Thus, selective reduction of the ore may be accomplished by any one of a number of techniques well known to those skilled in the art, e.g., by the controlled addition of carbon, as referred to hereinbefore. Such modifications and variations are considered to be within the purview and scope of the invention and appended claims.

We claim:

1. A process for recovering nickel-rich ferro-nickel from oxide nickel ores containing small amounts of nickel and larger amounts of iron which comprises reducing said ore in the solid state at a high temperature, near but below the point of incipient fusion of the ore where substantial ore agglomeration would occur, in the presence of a selective reducing atmosphere to reduce substantially all the nickel and a controlled portion of the iron amounting to less than 50% of the total iron contained in said ore to the metallic state; smelting said reduced ore while still at a high temperature to form a molten nickel-iron melt containing metallic iron and metallic nickel and a slag containing iron in the oxide state and gangue constituents in the reduced ore and floating on said molten nickel-iron melt; removing said slag floating on said molten nickel-iron melt; top blowing the remaining molten nickel-iron melt with oxygen, while agitating the said nickel-iron melt with mechanical means substantially independent of oxygen-containing gases introduced into the furnace, to insure intimate and efficient gas-liquid-solid contact by induced turbulence and to substantially attain equilibrium conditions in said molten nickel-iron melt; using sufficient oxygen in said top blowing operation to remove impurities and to eliminate metallic iron by oxidation and slagging in the presence of metallic nickel while avoiding oxidation of substantial amounts of nickel; and continuing said top blowing with oxygen and said agitation to eliminate iron and to upgrade said molten nickel-iron melt, thereby forming a nickel-rich, refined ferro-nickel containing at least about 65% nickel and thereby recovering at least about 90% of the nickel from said ore.

2. A process as described in claim 1 in which the ore is reduced at a temperature of at least about 1600° F. and below the incipient fusing point of said ore and the nickel-iron melt is at a temperature of below 3100° F. during the blowing with oxygen.

3. In a process for refining a nickel-iron metallic material to form a nickel-rich refined ferro-nickel that improvement which comprises forming a molten bath of said nickel-iron material; top blowing said molten bath with oxygen while maintaining the said bath in a state of agitation, employing mechanical means substantially independent of gases introduced into the furnace, to insure intimate and efficient gas-liquid-solid contact by induced turbulence and to substantially attain equilibrium conditions in said molten nickel-iron bath; using sufficient oxygen in said top blowing operation to remove impurities and to eliminate metallic iron by oxidation and slagging in the presence of metallic nickel while avoiding oxidation of substantial amounts of nickel; and continuing said top blowing with oxygen and said agitation to eliminate iron and to upgrade said molten nickel-iron melt, thereby forming a nickel-rich, refined ferro-nickel containing at least about 65% nickel and thereby recovering at least about 90% of the nickel from said nickel-iron metallic material.

4. A process as described in claim 3 in which top blowing of the nickel-iron melt with oxygen to eliminate iron is conducted in an acid-lined furnace and silica flux is added during said blowing to produce an acid slag with a silica content substantially at the saturation limit.

5. A process for recovering nickel as a high-grade ferro-nickel containing at least about 65% nickel from a nickel-containing lateritic ore containing less than 5% nickel, less than 0.10% cobalt and being less than about one-third iron which comprises selectively reducing said ore in the solid state at a high temperature near but below the point of incipient fusion of the ore where substantial ore agglomeration would occur, to reduce substantially all the nickel and not more than about twice as much iron to the metallic state; smelting said reduced ore while still at a high temperature to form a molten nickel-iron melt containing metallic iron and metallic nickel and a slag containing iron in the oxide state and gangue constituents in the reduced ore and floating on said molten nickel-iron melt; removing said slag floating on said molten nickel-iron melt; top blowing the remaining molten nickel-iron melt with oxygen while agitating the said nickel-iron melt with mechanical means substantially independent of oxygen-containing gases introduced into the furnace, to insure intimate and efficient gas-liquid-solid contact by induced turbulence and to substantially attain equilibrium conditions in said molten nickel-iron melt; using sufficient oxygen in said top blowing operation to remove impurities and to eliminate metallic iron by oxidation and slagging in the presence of metallic nickel while avoiding oxidation of substantial amounts of nickel; and continuing said top blowing with oxygen and said agitation to eliminate iron, the slag produced during the first part of the blowing operation being reverted to the smelting furnace for reduction of its nickel content and the slag produced during the last part of the blowing operation being retained in the top blowing furnace for reduction of its nickel content during the first part of the next blowing cycle, and to upgrade said molten nickel-iron melt, thereby forming a nickel-rich, refined ferro-nickel containing at least about 65% nickel and thereby recovering at least about 90% of the nickel from said ore.

6. A process for recovering a nickel-rich ferro-nickel from a nickel-containing lateritic ore of the silicate type which comprises forming a molten bath of said ore; reducing said molten ore in the presence of a selective reducing atmosphere to reduce substantially all the nickel and a controlled portion of the iron amounting to less than 50% of the total iron contained in said ore to the metallic state, and to form a molten nickel-iron melt containing metallic iron and metallic nickel and a slag containing iron in the oxide state and gangue constituents in the reduced ore and floating on said nickel-iron melt; removing said slag floating on said molten nickel-iron melt; top blowing the remaining molten nickel-iron melt with oxygen, while agitating the said nickel-iron melt with mechanical means substantially independent of oxygen-containing gases introduced into the furnace, to insure intimate and efficient gas-liquid-solid contact by induced turbulence and to substantially attain equilibrium conditions in said molten nickel-iron melt; using sufficient oxygen in said top blowing operation to remove impurities and to eleminatae metallic iron by oxidation and slagging in the presence of metallic nickel while avoiding oxidation of substantial amounts of nickel; and continuing said top blowing with oxygen and said agitation to eliminate iron and to upgrade said molten nickel-iron melt, thereby forming a nickel-rich, refined ferro-nickel containing at least about 65% nickel and thereby recovering at least about 90% of the nickel from said ore.

7. A process for recovering nickel-rich ferro-nickel from oxide nickel ores containing small amounts of nickel and larger amounts of iron which comprises selectively reducing said ore in the solid state at a high temperature, near but below the point of incipient fusion of the ore where substantial ore agglomeration would occur, to reduce substantially all the nickel and a controlled portion of the iron amounting to less than 50% of the total iron contained in said ore to the metallic state; smelting said reduced ore while still at a high temperature to form a molten nickel-iron melt containing metallic iron and metallic nickel and a slag containing iron in the oxide state and gangue constituents in the reduced ore and floating on said molten nickel-iron melt; removing said slag floating on said molten nickel-iron melt; top blowing the remaining molten nickel-iron melt with oxygen, while agitating the said nickel-iron melt with mechanical means, to insure intimate and efficient gas-liquid-solid contact by induced turbulence and to substantially attain equilibrium conditions in said molten nickel-iron melt; and continuing said top blowing with oxygen and said agitation to remove impurities and to eliminate metallic iron by oxidation and slagging in the presence of metallic nickel, while avoiding oxidation of substantial amounts of nickel, thereby upgrading said molten nickel-iron melt and forming a nickel-rich, refined ferro-nickel containing at least about 65% nickel and thereby recovering at least about 90% of the nickel from said ore.

References Cited in the file of this patent

UNITED STATES PATENTS

| | | |
|---|---|---|
| 2,395,029 | Baily | Feb. 19, 1946 |
| 2,598,393 | Kalling et al. | May 27, 1952 |
| 2,750,286 | Perrin | June 12, 1956 |
| 2,767,075 | Greene | Oct. 16, 1956 |
| 2,850,376 | Queneau et al. | Sept. 2, 1958 |
| 2,850,377 | Townshend | Sept. 2, 1958 |
| 2,914,396 | Stargardter | Nov. 24, 1959 |